United States Patent [19]
Brown

[11] Patent Number: 5,341,793
[45] Date of Patent: Aug. 30, 1994

[54] DRAWER ATTACHMENT FOR BARBECUE GRILLS

[76] Inventor: Thomas J. Brown, R.D. 3, Harding Wood 165, 9 Birchwood Dr., Newfield, N.J. 08344

[21] Appl. No.: 103,668

[22] Filed: Aug. 10, 1993

[51] Int. Cl.⁵ ............................ A47J 37/00; F24C 3/00
[52] U.S. Cl. .................... 126/41 R; 126/276; 312/334.44
[58] Field of Search .............. 126/25 R, 9 R, 37 R, 126/37 A, 37 B, 41 R, 38, 40, 276, 339, 337 R, 332, 275 R, 197; 312/246, 334.44, 334.46, 330.1, 334.3

[56] References Cited
U.S. PATENT DOCUMENTS

| | | | |
|---|---|---|---|
| 1,190,216 | 7/1916 | Bloxham | 126/276 |
| 1,406,129 | 2/1922 | Woltz | 312/334.44 |
| 4,166,413 | 9/1979 | Meszaros | 126/25 R |
| 4,696,282 | 9/1987 | Incitti | 126/25 R |
| 5,027,788 | 7/1991 | Schlosser et al. | 126/25 R |
| 5,109,834 | 5/1992 | Collins | 126/25 R |

*Primary Examiner*—James C. Yeung
*Attorney, Agent, or Firm*—Norman E. Lehrer

[57] ABSTRACT

An apparatus for use with a gas grill cart which comprises a cutting board and a drawer for preparation of food and storage of grilling accessories. The apparatus is adapted for use with grill carts having a base and a four-posted vertically extending structure having arms extending perpendicularly from each post. The invention is adapted to be placed between two of the arms previously having wooden slots extending therebetween and is comprised of a cutting board which has a length greater than the length of the space between the arms of the cart. The cutting board has guides attached to the underside thereof for engagement with a drawer which is similarly held on the cart via the engagement of the cutting board with the arms. The drawer has a locking device thereon for engagement with a cutout in one of the guides attached to the cutting board. As such, the drawer cannot be fully removed from the slots of the guides and, therefore, accidental spillage of the drawer and its contents is prevented. The cutting board can be permanently attached to the arms of the cart via screws or the like used to previously attach the slats. The cutting board can be used to cut and otherwise prepare food to be grilled and the drawer can be used to store grilling accessories such as brushes and spatulas.

6 Claims, 2 Drawing Sheets

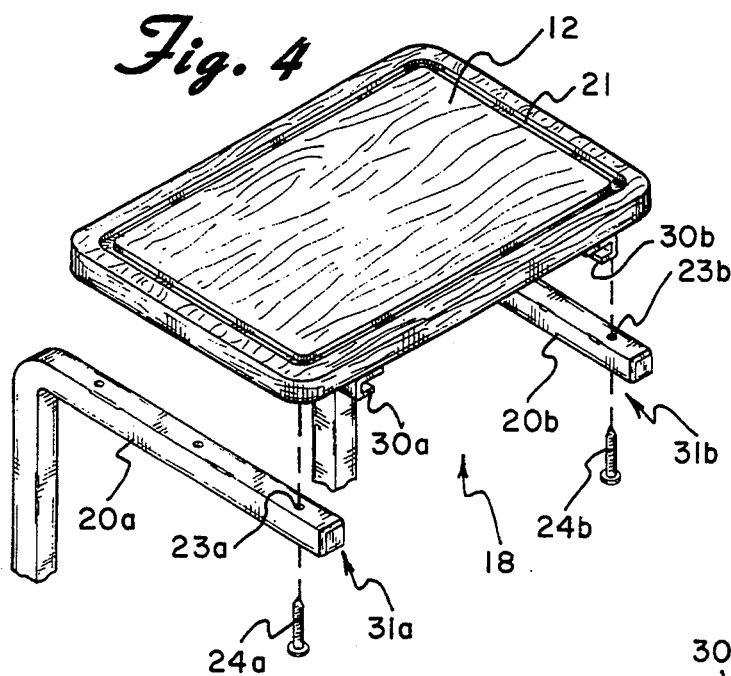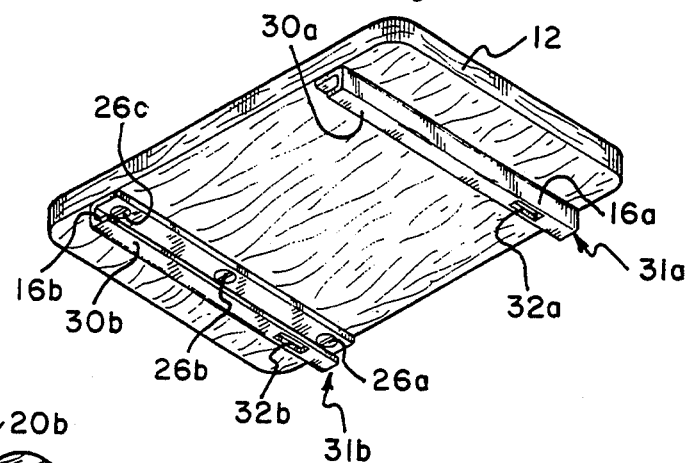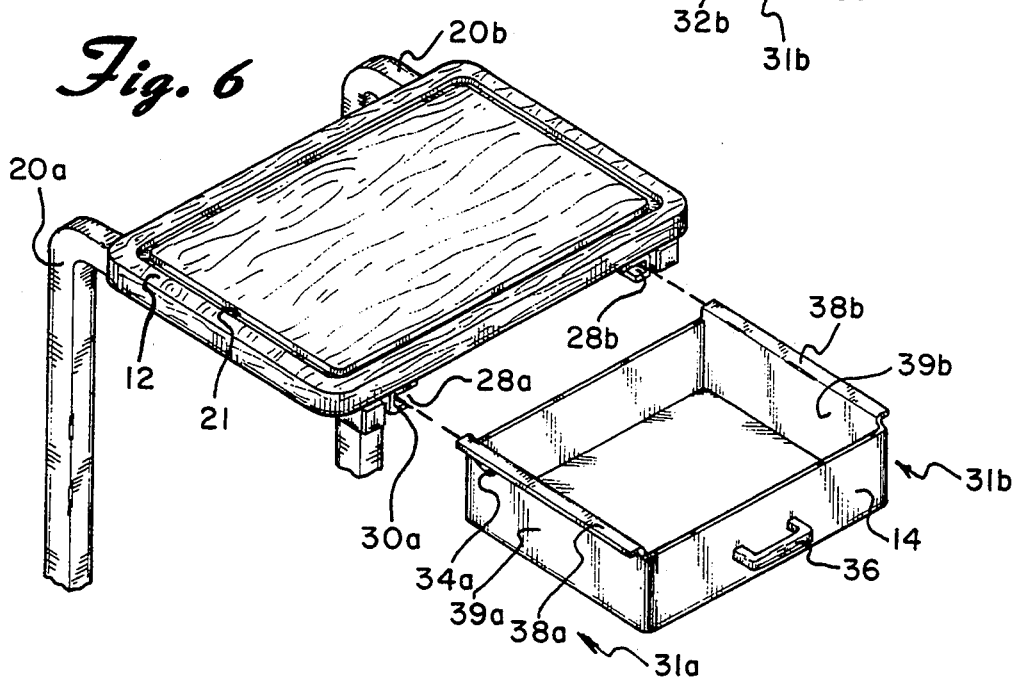

DRAWER ATTACHMENT FOR BARBECUE GRILLS

BACKGROUND OF THE INVENTION

This invention is directed toward barbecue grills and, more particularly to a combination of a drawer and cutting board which is adapted to be attached to the support arms of a standard grill cart.

Gas grills are generally used for outdoor barbecuing. Many of these grills are of the transportable type wherein the grill is attached to a support structure having wheels and handles for pushing the support structure or cart into a storage area. Accordingly, the grill is kept out of inclement weather and is also kept out of the way when not in use. Typically, the carts or supports for holding the grills comprise a flat bottom with wheels whereon the grill is supported. For purposes of pushing the grill around, arms typically extend upward from the flat bottom to a height accessible to the average person and then extend outwardly on a horizontal plane for grasping by that person. The arms are frequently connected by wooden slats or the like which serve the purposes of stabilizing the cart while also acting as a table or the like for supporting grill accessories and/or food.

It is frequently the nature of such slats that there are spaces therebetween. This can make the use of the slats problematic for holding the food and accessories. In place of these wooden slats or the like, flat boards or trays have been used for providing a flat and uniform surface on which to prepare or hold the food. However, for those persons owning the typical cart having the wooden slats, food preparation and the like remain problematic. While different carts have been proposed and invented, none of these inventions are directed toward retrofitting existing wooden slat carts with a flat-top cutting board and drawer for food preparation and accessory storage, respectively.

For example, U.S. Pat. No. 4,688,541 to Stephen et al. discloses an attachment for a barbecue grill. Within this attachment, the patent shows a frame having a pair of parallel spaced-apart bars extending therefrom. A shelf or serving board is adapted to fit over the bars for providing a surface for food preparation. However, as can be seen from the drawing, the Stephen et al. invention is not adaptable for use with typical wood slat carts nor does it have a drawer for storage of grill accessories.

Design patent No. D 185,035 to Murdoch discloses a portable barbecue unit. Similar to Stephen et al., the unit discloses parallel arms or legs extending from the barbecue cart and a flat surface extending therebetween for use in food preparation or the like. However, again, the unit disclosed in Murdoch is not adaptable for use with the typical wood slat arrangement nor does it appear to have an easily accessible drawer for storage of grilling accessories.

U.S. Pat. No. 5,027,788 to Schlosser et al. discloses a barbecue kettle cart. The kettle cart includes a wheeled cart member having handles for pushing the same and a grill integrally attached thereto. Arms extend parallel therefrom and have a flat tray or the like extending therebetween for use in food preparation. Again, and as discussed above, however, there is no drawer for storage of grill accessories and the kettle cart tray disclosed in Schlosser is not adaptable for use with the typical wooden slat-type arrangement.

The patent to Meszaros, U.S. Pat. No. 4,166,413 discloses a barbecue grill. The grill has a wheeled cart attached thereto wherein several planar members extend therefrom for use in food preparation and/or the like. In addition, the barbecue in Meszaros includes a drawer attached to the underside of a support. Again, while a drawer and support member are disclosed, it is not adaptable for use with barbecues having the typical wood slat arrangement.

Finally, additional patents to Berger, U.S. Pat. No. 5,104,080; Sampson et al., U.S. Pat. No. 4,337,751; and Baynes, U.S. Pat. No. 4,628,896 disclose grills or the like having platforms or storage-type means extending therefrom for use in food preparation and for holding the food. However, in each of these patents, a drawer is lacking and, as discussed above, none of the platforms are adaptable for use with the typical wooden slat cart arrangement.

SUMMARY OF THE INVENTION

The present invention is an apparatus for use with barbecue grills which comprises a cutting board and an attached drawer for use in preparing food and storing grill accessories. The invention is adapted to be used with gas grills having attached carts wherein the carts are generally of the wood slat variety.

The invention is comprised of a planar of board or plastic having a drawer slidably attached to the underside thereof. The board is designed for use in cutting and preparing food items while the drawer is designed for storing the accessories for grills and the like. The invention is adapted to be attached to a grill cart arrangement wherein the cart comprises a base having posts extending substantially vertically from the corners thereof. At a point comfortable for engagement with a human, arms bend 90° and extend outwardly and horizontally from the posts. Wooden slats or the like are typically placed on top of the arms for securing the same together and for supplying a work surface. The problems with the work surface formed are the spaces between the slats and the lack of storage space. The present invention is adapted to cure these defects.

The device of the present invention is adapted to be placed between the horizontally extending arms and rest thereon. The board extends a length greater than the space between the arms and the drawer is of a width to fit between the arms. Accordingly, the board or the like rests upon the arms and supports the device. Screws can be used to secure the board to the arms using the holes already existing in the arms. With the invention installed, a flat table top is provided to the grill for food preparation and support of the same while the drawer provides storage space for grill accessories and the like.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 4 is an exploded view showing the method of attaching the cutting board to the arms of the grill cart;

FIG. 5 is a bottom perspective view of the cutting board and guides for engaging the drawer, and FIG. 6 is a perspective, exploded view showing the method of installing the drawer with the board installed on the cart.

DETAILED DESCRIPTION OF THE PREFERRED EMBODIMENT

Figure 1:
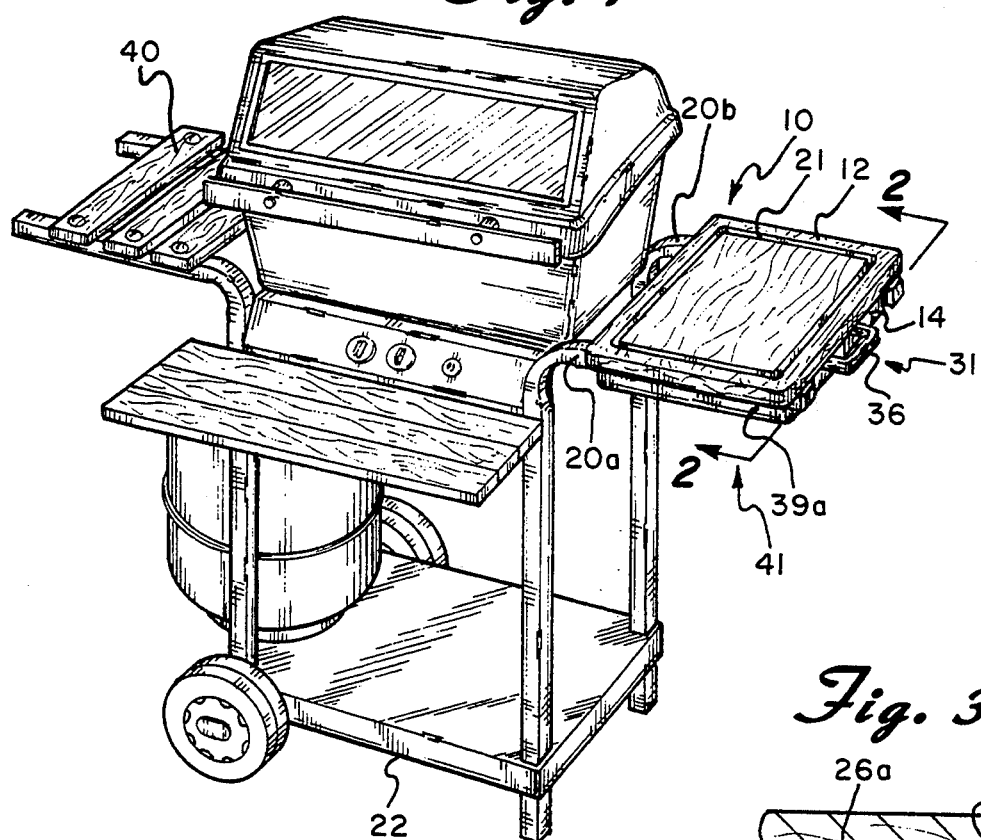
FIG. 1 is a perspective view of the invention installed on a grill cart.

Referring now to the drawings in detail wherein like reference numerals have been used throughout the various figures to designate like elements, there is shown in FIG. 1 a perspective view of the combined drawer and work surface of the present invention attached to a gas grill cart and designated generally as 10. The invention is comprised essentially of the cutting board 12, the drawer 14 and the guides 16a and 16b.

Figure 2:
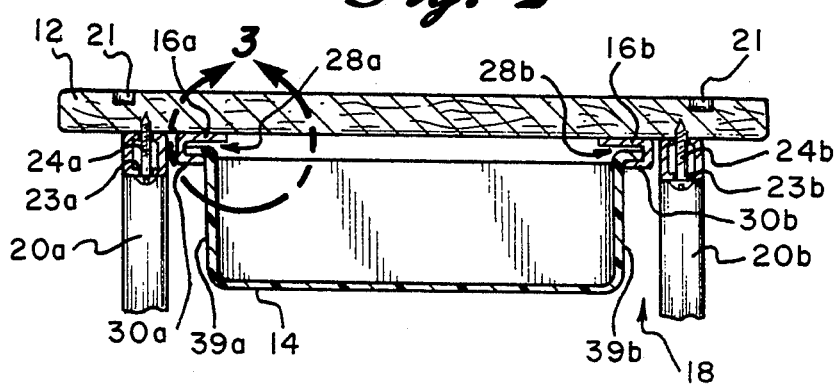
FIG. 2 is a cross-sectional view taken along line 2—2 of FIG. 1.

The cutting board or work surface 12 is preferably a wooden cutting board, although other materials can be used such as plastic, which extends a length greater than the length of the space 18 between the arms 20a and 20b of the grill cart 22. As shown in FIG. 2, the cutting board extends this length so that it may rest upon the arms 20a and 20b so as to support the invention on the cart. The upper surface of the board 12 has a groove 21 running adjacent the perimeter thereof for the collection of juices and the like. By using the same holes 23a and 23b, as well as others, through the arms 20a and 20b and the screws 24a and 24b, the cutting board 12 can be rigidly secured to the cart 22. The cutting board 12 has drawer guides 16a and 16b attached thereto on its underside 25 as shown in FIG. 4.

Figure 3:
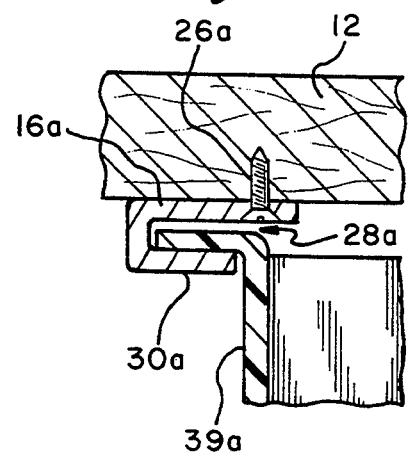
FIG. 3 is an enlarged view taken along line 3 of FIG. 2.

The guides 16a and 16b are substantially U-shaped members wherein one side of the U extends slightly longer than the other, as shown in FIG. 3 and is attached to the board 12. The guides 16a and 16b are attached to the underside of the cutting board 12 via screws, again as shown in FIG. 3, passing through holes in the guides and into the cutting board. As shown in FIG. 5, the guides 16a and 16b are attached to the underside of the cutting board at three places for each guide via screws such as shown at 26a–26c. The guides 16a and 16b are spaced apart so as to engage the drawer 14 within the slots 28a and 28b. For guides 16a and 16b, the shorter horizontal members 30a and 30b have cutouts 32a and 32b therein, respectively, located toward the free ends 31a and 31b thereof. The cutouts 32a and 32b are substantially rectangular in shape and are adapted to receive therein the locking devices 34a and 34b, respectively.

The locking devices 34a and 34b are the same and therfore only one, 34a, will be described in detail, it being understood that the description applies equally to locking device 34b. Locking device 34a is essentially a spring-loaded tab extending from the underside of the flange 38a. The spring-loaded tab 34a is adapted to engage the rectangular cutout 32a for preventing accidental complete removal of the drawer from the guides 16a and 16b. As such, the locking device 34a will snap into the rectangular cutout 32a for locking the drawer in place and for avoiding full removal of the same when the drawer 14 is sufficiently opened.

The drawer 14 is a typical box-shaped drawer having a handle 36 and flanges 38a and 38b extending horizontally from the side walls 39a and 39b of the drawer. The flanges 38a and 38b are substantially rectangular in shape and are adopted to engage the slots 28a and 28b of the drawer guides 16a and 16b. As shown in FIG. 6, the flanges 38a and 38b fit into the slots 28a and 28b in a sliding manner such that the drawer can be moved inwardly and outwardly within the grooves.

The invention is used by first assembling the same as discussed in the foregoing description and then installing it. Accordingly, as shown in FIG. 4, the slats 40 must be removed from the side, for example at 41, at which the invention is to be installed. After removal of the slats as shown in FIG. 5, the cutting board 12 is placed onto the arms 20a and 20b and the screws 24a and 24b, for example, are used through the existing holes for securing the board 12 to the arms 20a and 20b. At this time, the board already has the guides 16a and 16b attached thereto. The drawer 14 is simply slid into the slots 28a and 28b by inserting the flanges 38a and 38b into the same. The invention is then ready for use as shown in FIG. 1 and when the drawer is pulled outwardly, away from the grill, to use the same, the locking devices 34a and 34b will engage the rectangular cutouts 32a and 32b, respectively, for preventing accidental removal of the drawer and potential spillage of its contents. The drawer is used by simply placing grill accessories into the same and shutting it during non-use while the cutting board can be used for preparation and support of food to be cooked on the grill.

The present invention may be embodied in other specific forms without departing from the spirit or essential attributes thereof and accordingly reference should be made to the appended claims rather than to the foregoing specification as indicating the scope of the invention.

What is claimed is:

1. A drawer attachment for providing a surface on which food can be cut and for storing grill accessories, said drawer attachment for use in conjunction with a grill support apparatus wherein said grill support apparatus comprises a stand for supporting a grill, first and second sides and a pair of substantially parallel positioned arms extending from at least one of said sides and having a space therebetween, said drawer attachment comprising a cutting board having a top and a bottom, said bottom of said cutting board being secured to said pair of substantially parallel positioned arms, a drawer having flanges extending therefrom and means for securing said drawer to said cutting board.

2. The invention according to claim 1 wherein said cutting board extends for a length greater than the size of said space and said drawer having a width slightly less than the size of said space, said cutting board resting on said arms for supporting said drawer means.

3. The invention according to claim 1 wherein said means for securing said drawer to said cutting board comprises a pair of guides connected to said cutting board, said guides including slots, said flanges being slidably mounted within said slots of said guides.

4. The invention according to claim 3 wherein one of said guides includes an opening therein and one of said flanges includes a tab attached thereto, said tab being adapted to engage said opening for securing said drawer in said guides.

5. The invention according to claim 4 wherein said tab is a spring loaded extension being pivotally attached to said one of said flanges.

6. A drawer attachment for providing a surface on which food can be cut and for storing grill accessories, said drawer attachment for use in conjunction with a barbecue grill support apparatus having a stand for supporting a grill, first and second sides and a pair of substantially parallel positioned arms extending from at least one of said sides and having a space therebetween, said drawer attachment comprising:

a cutting board having a top and a bottom, said bottom of said cutting board being secured to said pair of substantially parallel positioned arms, said cutting board having a pair of guides on the bottom thereof positioned between said arms, said guides including slots;

a drawer having flanges extending therefrom, said flanges of said drawer being slidably mounted within said slots of said guides;

a spring loaded extension pivotally connected to one of said flanges;

said top of said cutting board having a groove therein running adjacent to the periphery thereof for the collection of liquids; and one of said guides further including an opening therethrough for engaging said spring loaded extension for preventing accidental removal of said drawer.

* * * * *